US012769049B2

(12) United States Patent
Ikenishi et al.

(10) Patent No.: US 12,769,049 B2
(45) Date of Patent: Oct. 20, 2026

(54) HIGH ELASTIC-GLASS SUBSTRATE FOR LIGHT GUIDE PLATE WITH DOUBLE-SIDED DIFFRACTIVE OPTICAL ELEMENT FOR TRANSPARENT DISPLAY

(71) Applicant: HOYA CORPORATION, Tokyo (JP)

(72) Inventors: Mikio Ikenishi, Tokyo (JP); Itaru Watanabe, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 284 days.

(21) Appl. No.: 18/616,714

(22) Filed: Mar. 26, 2024

(65) Prior Publication Data

US 2024/0361512 A1 Oct. 31, 2024

(30) Foreign Application Priority Data

Mar. 30, 2023 (JP) ................................ 2023-055935
Mar. 30, 2023 (JP) ................................ 2023-055949
Mar. 30, 2023 (JP) ................................ 2023-055957
Mar. 30, 2023 (JP) ................................ 2023-055962
Mar. 18, 2024 (JP) ................................ 2024-042297
Mar. 18, 2024 (JP) ................................ 2024-042314
Mar. 18, 2024 (JP) ................................ 2024-042324
Mar. 18, 2024 (JP) ................................ 2024-042412

(51) Int. Cl.
*F21V 8/00* (2006.01)
*G02B 27/01* (2006.01)

(52) U.S. Cl.
CPC ......... *G02B 6/0065* (2013.01); *G02B 6/0016* (2013.01); *G02B 27/0172* (2013.01); *G02B 2027/0178* (2013.01)

(58) Field of Classification Search
CPC ................ G02B 6/0065; G02B 6/0016; G02B 27/0172; G02B 2027/0178
See application file for complete search history.

(56) References Cited

U.S. PATENT DOCUMENTS

| | | | | |
|---|---|---|---|---|
| 2013/0186467 A1* | 7/2013 | Saeki ....................... | G02B 1/11 359/601 |
| 2016/0216792 A1 | 7/2016 | Ogawa et al. | |
| 2023/0105927 A1* | 4/2023 | Ritter ....................... | G02B 1/00 345/8 |

FOREIGN PATENT DOCUMENTS

| | | |
|---|---|---|
| JP | 2016-139174 | 8/2016 |

OTHER PUBLICATIONS

Hoya, Introduction of FDS24-W, Mar. 1, 20204, https://www.hoya-opticalworld.com/english/news/index.html#40 and the corresponding data sheet for FDS24-W, https://www.hoya-opticalworld.com/common/pdf2020/FDS24-W.pdf (Year: 2020).*

"Hoya Group Optics Division Homepage", Dec. 13, 2021.

"Hoya Group Optics Division Optical material & wafer for AR/MR waveguide", hoya-opticalworld.com, Dec. 13, 2021.

* cited by examiner

*Primary Examiner* — Ryan A Lepisto
(74) *Attorney, Agent, or Firm* — Greenblum & Bernstein, P.L.C.

(57) ABSTRACT

A glass wafer for manufacturing a light guide plate, the glass wafer including: a glass part in a thin sheet shape; and a diffractive optical element part on two main surfaces of the glass part, in which one main surface of the glass part has an area of 1950 $mm^2$ or greater, the glass part has a thickness of 3.0 mm or less, and the glass part has a Young's modulus of 100 GPa or greater.

20 Claims, 4 Drawing Sheets

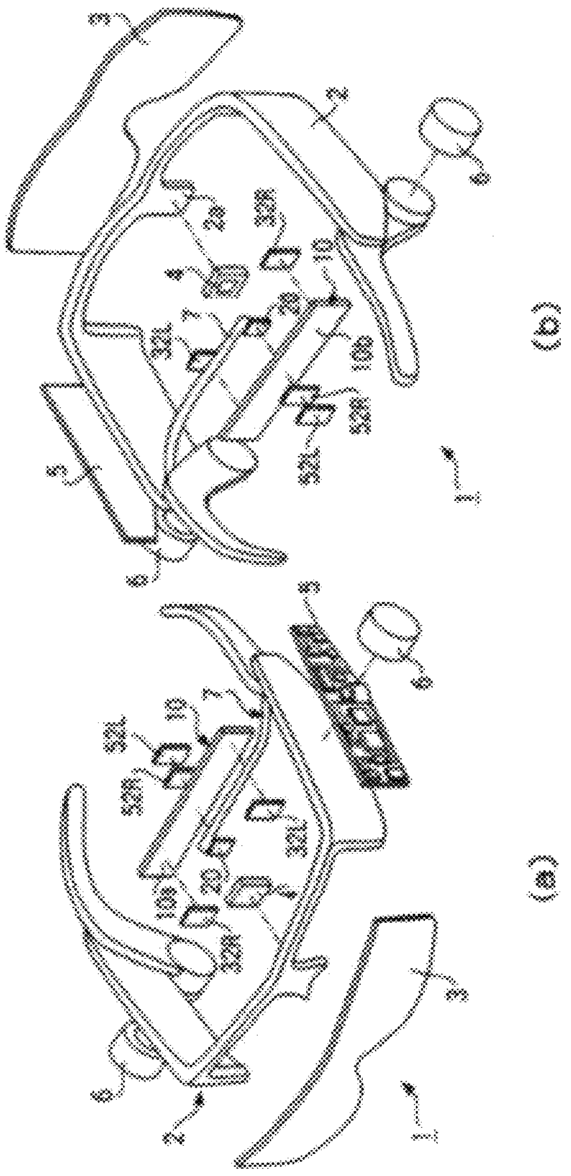
[FIG. 1]

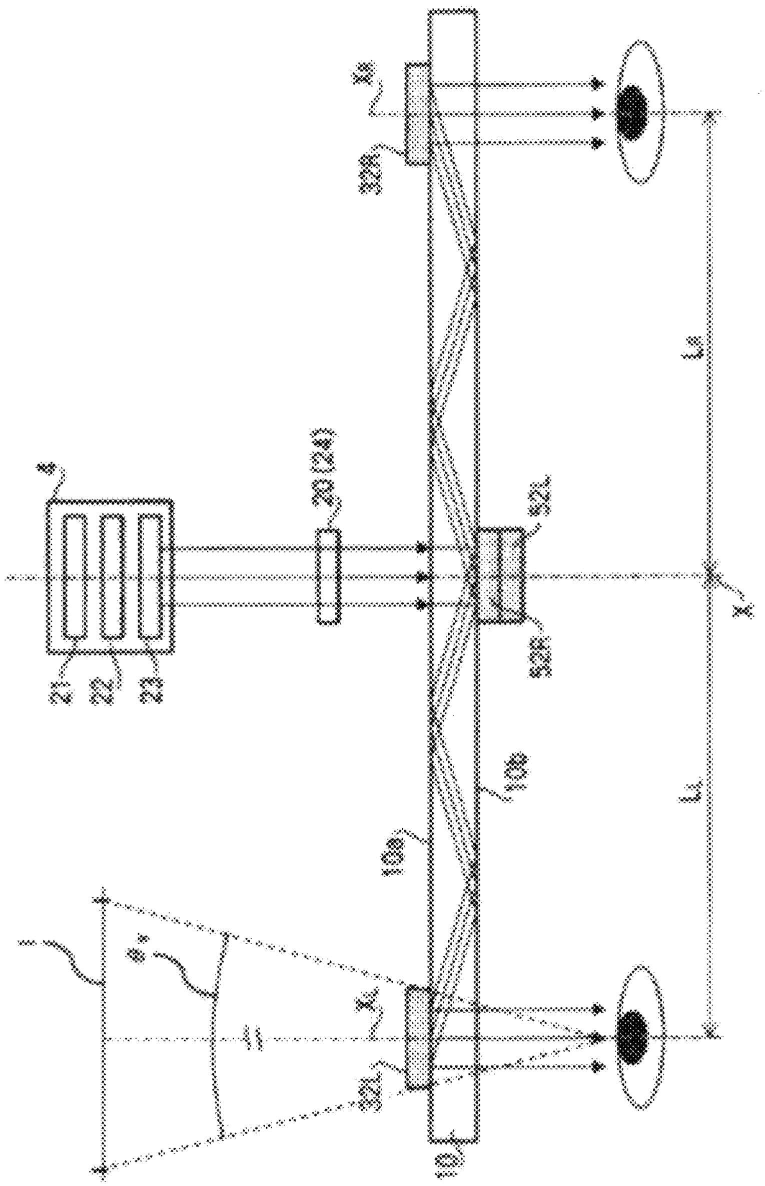
[FIG. 2]

[FIG. 3]
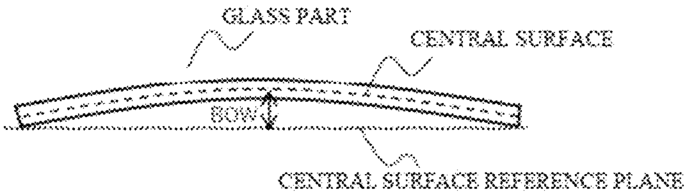
[FIG. 4]
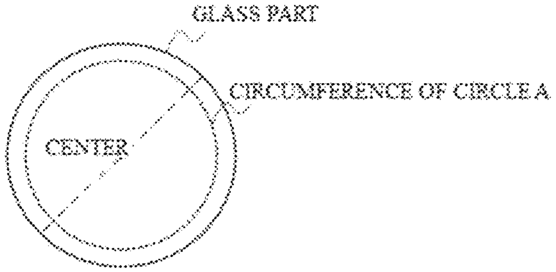
[FIG. 5(1)]
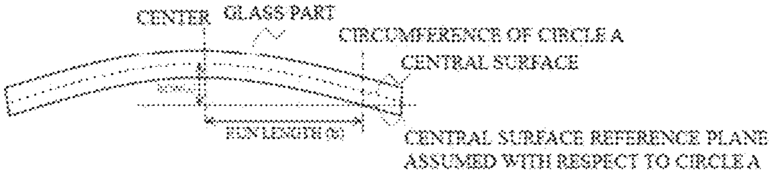

[FIG. 5(2)]
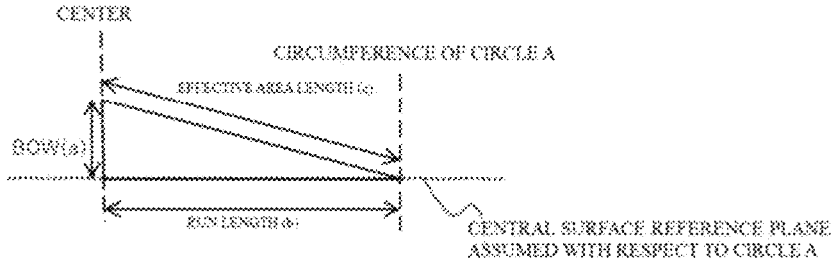

HIGH ELASTIC-GLASS SUBSTRATE FOR LIGHT GUIDE PLATE WITH DOUBLE-SIDED DIFFRACTIVE OPTICAL ELEMENT FOR TRANSPARENT DISPLAY

BACKGROUND OF THE INVENTION

The present invention relates to a glass wafer, a light guide plate, and an image display device.

In recent years, along with the progress in the technologies for augmented reality (AR), mixed reality (MR), and virtual reality (VR), display devices such as head-mounted displays have been developed as AR devices, MR devices, and VR devices. Among them, attention has been paid to a spectacle-type wearable terminal referred to as smart glasses, which is disclosed in Patent Document 1.

In smart glasses, light emitted from an image light source is guided by light guide plates corresponding to spectacle lenses, to the front of the wearer's pupils and is displayed as an image.

Specifically, light emitted from an image light source is allowed to enter the interior of a light guide plate by a diffractive optical element formed on the surface of the light guide plate. Then, the light that has entered the interior of the light guide plate travels while repeatedly undergoing total reflection inside the light guide plate and is emitted to the direction of the wearer's pupils by a diffractive optical element provided in front of the wearer's pupils.

Light guide plates used in smart glasses are manufactured using semiconductor circuit manufacturing facilities. In a mass production process for semiconductor circuits, a large number of integrated circuits are formed on the surface of a silicon wafer by a lithography technology or the like. Then, the silicon wafer on which a large number of integrated circuits have been formed is cut and separated by dicing, and a large number of semiconductor circuit elements are manufactured.

The light guide plate can also be manufactured by a process similar to the mass production process for semiconductor circuits. That is, a large number of light guide plates can be manufactured by forming a large number of diffractive optical elements on the surface of glass in a thin sheet shape called a glass wafer, and cutting and separating the glass wafer by dicing.

Patent Document 1: JP 2016-139174 A

BRIEF SUMMARY OF THE INVENTION

Formation of diffractive optical elements requires submicron precision. However, for example, when forming diffractive optical elements on the surface of a glass wafer, the glass wafer is heated to 100° C. or higher. The inventors have found that in conventional glass wafers, warping occurs in the glass wafers due to this heating, causing a problem in that diffractive optical elements cannot be formed with high precision. Specifically, the reason is as follows.

Regarding the material for the diffractive optical elements, inorganic materials such as titanium oxide, silicon nitride, and silicon carbide, or organic materials such as a transparent resin are used. In the case of using an inorganic material, a film of an inorganic material is formed on the surface of a glass wafer, and the film is subjected to microfabrication by photolithography to form diffractive optical elements. In photolithography, a photoresist is applied on the surface of the glass wafer on which the film has been formed, the wafer and the photoresist are heated on a hot plate, and prebaking for evaporating the solvent of the photoresist is performed. Next, the pattern of a photomask is transferred onto the photoresist by exposure to ultraviolet radiation. After the exposure, the wafer is placed on a hot plate and heated to about 120° C. to 150° C. (post-baking) in order to thermally crosslink the photoresist. Next, the photoresist is developed, and then fine surface unevenness is formed on the film by etching to form a diffractive optical element. In the case of using an organic material, a resin such as a transparent ultraviolet-curable resin is applied on a main surface of the glass wafer to form a coating film, and the coating film is pressed with a mold having an inverse shape of a fine uneven pattern of the diffractive optical element to transfer the pattern onto the coating film Thereafter, the wafer is placed on a hot plate and heated to around 125° C. to be fired, and thus a diffractive optical element is formed.

Regardless of whether an inorganic material or an organic material is used, when the glass wafer is heated on a hot plate, warping occurs in the glass wafer. Glass has a relatively low thermal conductivity, and when the glass wafer is heated on a hot plate, a large temperature difference occurs between the main surface in contact with the hot plate, that is, the main surface facing downward, and the main surface on the opposite side, that is, the main surface facing upward. Since the amount of expansion of the main surface at a high temperature facing downward is greater than the amount of expansion of the main surface at a low temperature facing upward, the glass wafer warps in a downward convex shape. Since the peripheral part of the warped glass wafer is away from the hot plate, even within the main surface, the central part becomes hotter compared to the peripheral part. Since thermal crosslinking of the photoresist or baking of the organic material is carried out in this state, misregistration occurs in the fine pattern of the diffractive optical element even after heating is completed.

A light guide plate having diffractive optical elements on both sides is manufactured by forming a diffractive optical element on one side of a glass wafer and then further forming a diffractive optical element on the back side of the glass wafer. As described above, in conventional situations, even when forming a diffractive optical element on one side, a shift occurs in the position of the diffractive optical element on the wafer, resulting in a decrease in the positional accuracy. In order to obtain a light guide plate having diffractive optical elements on both sides, a diffractive optical element should be further formed on the back side of this glass wafer, in which the positional accuracy of the diffractive optical element is low. Also, when forming a diffractive optical element on the back side, since warping occurs in the glass wafer at the time of heating the glass wafer on a hot plate, it has been difficult to form the diffractive optical element with high precision. Accordingly, a further shift occurs in the positions of the diffractive optical elements on the front and back sides of the glass wafer.

As described above, after the diffractive optical elements are formed, the glass wafer is cut and separated by dicing to produce a large number of light guide plates; however, the positional accuracy of the diffractive optical elements in the individual light guide plates is decreased due to misregistration of the diffractive optical elements on the wafer. As a result, a shift occurs in the direction of light diffraction, and there may be a problem in that an operation for correcting this shift is required when assembling an image display device, or in a case where the amount of shift is large, the quality of the displayed image is lowered.

Thus, there is a demand for a glass wafer on which diffractive optical elements can be formed with high precision.

The present invention was achieved in view of such circumstances, and it is an object of the invention to provide a glass wafer in which warpage is reduced during the formation of diffractive optical elements, a light guide plate obtained from the glass wafer, and an image display device including the light guide plate.

The gist of the present invention is as follows.

(1) A glass wafer for manufacturing a light guide plate, the glass wafer including:

a glass part in a thin sheet shape; and a diffractive optical element part on two main surfaces of the glass part, in which one main surface of the glass part has an area of 1950 $mm^2$ or greater, the glass part has a thickness of 3.0 mm or less, and the glass part has a Young's modulus of 100 GPa or greater.

(2) The glass wafer according to (1), in which the diffractive optical element part has a periodic uneven structure, and the uneven structure has a period of 500 nm or less.

(3) The glass wafer according to (1), in which the glass part has a refractive index nd of 1.9 or greater.

(4) The glass wafer according to (1), in which an average linear expansion coefficient of the glass part at −30° C. to 70° C. is $80\times10^{-6}$ $K^{-1}$ or less.

(5) A light guide plate including:

a glass part; and a diffractive optical element part on two main surfaces of the glass part, in which the glass part has a thickness of 3.0 mm or less, and the glass part has a Young's modulus of 100 GPa or greater.

(6) The light guide plate according to (5), in which the diffractive optical element part has a periodic uneven structure, and the uneven structure has a period of 500 nm or less.

(7) The light guide plate according to (5), in which the glass part has a refractive index nd of 1.9 or greater.

(8) An image display device including the light guide plate according to (5).

(9) The image display device according to (8), in which the image display device is a spectacle-type device.

According to the present invention, a glass wafer in which warpage is reduced during the formation of diffractive optical elements, a light guide plate obtained from the glass wafer, and an image display device including the light guide plate, can be provided.

BRIEF DESCRIPTION OF THE SEVERAL VIEWS OF THE DRAWING

FIG. 1 is a diagram schematically illustrating the configuration of a head-mounted display using a light guide plate according to an aspect of the present invention;

FIG. 2 is a lateral view schematically illustrating the configuration of a head-mounted display using the light guide plate according to an aspect of the present invention;

FIG. 3 is a diagram schematically illustrating a method of measuring BOW;

FIG. 4 is a diagram schematically illustrating the glass part in a top view and describes a method of evaluating warpage of the glass part;

FIG. 5(1) is a diagram schematically illustrating a cross-section of the glass part and illustrates a method of evaluating warpage of the glass part; and FIG. 5(2) is a diagram illustrating the method of evaluating warpage of the glass part.

DETAILED DESCRIPTION OF THE INVENTION

In the present specification, unless particularly stated otherwise, the refractive index refers to a refractive index nd for the d-line of helium (wavelength 587.56 nm).

Furthermore, the Abbe number νd is used as a value representing the properties related to dispersion and is represented by the following expression. In the expression, nF represents the refractive index for the F-line of blue hydrogen (wavelength 486.13 nm), and nC represents the refractive index for the C-line of red hydrogen (656.27 nm).

$$\nu d=(nd-1)/(nF-nC)$$

In the present invention, unless particularly stated otherwise, the glass composition is indicated based on oxides. The "glass composition based on oxides" refers to a glass composition obtained by calculating the proportions of glass raw materials as being completely decomposed during melting and existing as oxides in the glass. The total content of all the glass components indicated based on oxides (excluding $Sb(Sb_2O_3)$ and $Ce(CeO_2)$ added as fining agents) is taken as 100% by mass. Notation of each glass component will be described as $SiO_2$, $TiO_2$, or the like in accordance with the custom. The contents of the glass components and the total content are on a mass basis unless particularly stated otherwise, and the unit "%" means "% by mass".

The contents of the glass components can be quantified by known methods, for example, methods such as an inductively coupled plasma atomic emission spectroscopy (ICP-AES) and inductively coupled plasma mass spectrometry (ICP-MS). Furthermore, in the present invention, the content of a constituent component being 0% means that this constituent component is substantially not included, and this component is allowed to be included at an inevitable impurity level.

An embodiment of the present invention will be described below.

Glass Wafer

A glass wafer according to the present embodiment has a glass part in a thin sheet shape and a diffractive optical element part on two main surfaces of the glass part.

<Glass Part>

(Shape)

With regard to the glass wafer according to the present embodiment, the glass wafer is in a thin sheet shape. Preferably, the glass part is in a disk shape. Furthermore, the glass part may have a thin sheet shape whose main surface has a polygonal, square, or rectangular shape. As the glass part has such a thin sheet shape, a light guide plate can be manufactured from the glass wafer using conventional semiconductor circuit manufacturing facilities.

(Area)

With regard to the glass wafer according to the present embodiment, the area of one main surface of the glass part is 1950 $mm^2$ or greater, preferably 4400 $mm^2$ or greater, more preferably 7850 $mm^2$ or greater, even more preferably 17670 $mm^2$ or greater, and still more preferably 70690 $mm^2$ or greater. The quantity of the light guide plates obtained per unit area can be increased by increasing the area of the main surface of the glass part. The upper limit of the area of the main surface of the glass part is not particularly limited; however, from the viewpoint of using conventional semiconductor circuit manufacturing facilities, the upper limit is usually 159050 $mm^2$.

(Diameter of Inscribed Circle)

With regard to the glass wafer according to the present embodiment, the size of the glass part can also be evaluated by the size of a circle virtually inscribed in the shape of the main surface of the glass part. That is, the diameter of the circle virtually inscribed in the shape of the main surface of the glass part is preferably 50 mm or greater, more preferably 75 mm or greater, even more preferably 100 mm or greater, and still more preferably 150 mm or greater. The quantity of the light guide plates obtained per unit area can be increased by increasing the diameter of the inscribed circle. The upper limit of the diameter of the inscribed circle is not particularly limited; however, from the viewpoint of using conventional semiconductor circuit manufacturing facilities, the upper limit is usually 450 mm.

(Diameter)

With regard to the glass wafer according to the present embodiment, when the glass part has a disk shape, the diameter of the glass part is preferably 50 mm or greater, more preferably 75 mm or greater, even more preferably 100 mm or greater, and still more preferably 150 mm or greater. By increasing the diameter of the glass part, the quantity of the light guide plate obtained per unit area can be increased. The upper limit of the diameter of the glass part is not particularly limited; however, from the viewpoint of using conventional semiconductor circuit manufacturing facilities, the upper limit is usually 450 mm.

(Thickness)

With regard to the glass wafer according to the present embodiment, the thickness of the glass part is 3.0 mm or less, preferably 1.0 mm or less, more preferably 0.8 mm or less, and even more preferably 0.5 mm or less. The lower limit of the thickness of the glass part is not particularly limited; however, the lower limit is usually 0.2 mm, and preferably 0.25 mm. By setting the thickness of the glass part within the above-described range, a light guide plate that can be used as a lens for smart glasses can be manufactured, and furthermore, a light guide plate can be manufactured from the glass wafer using conventional semiconductor circuit manufacturing facilities.

(Young's Modulus)

With regard to the glass wafer according to the present embodiment, the Young's modulus of the glass part is 100 GPa or greater, preferably 110 GPa or greater, and more preferably 120 GPa or greater. The upper limit of the Young's modulus of the glass part is not particularly limited; however, the upper limit is usually 150 GPa, and preferably 140 GPa. By setting the Young's modulus of the glass part within the above-described range, when the glass part is heated to form the diffractive optical element part on the main surface of the glass part, warpage of the glass part can be reduced, and the diffractive optical element part can be formed with high precision. Furthermore, by setting the Young's modulus of the glass part within the above-described range, damage occurring when transporting the glass wafer can be reduced. Furthermore, damage caused when the glass wafer or the glass part is taken in and out of wafer cassettes, and damage caused during processing can also be reduced.

The Young's modulus is measured according to JIS R 1602-1995 and calculated. Specifically, a glass sample formed of the same material as that of the glass part and having a size of 20 mm in length, 20 mm in width, and 100 mm in height is sufficiently annealed and placed in a constant temperature chamber, the longitudinal wave velocity (Vl) and the shear wave velocity (Vs) of 5 MHz ultrasonic waves are measured, and the Young's modulus (E) and the rigidity modulus (G) are calculated by the following expressions, respectively.

$$E = (4G^2 - 3G \times Vl^2 \times \rho)/(G - Vl^2 \times \rho)$$

$$G = Vs^2 \times \rho$$

In the above expressions, ρ represents the density of the glass sample, and the value of specific gravity can be used as ρ. The density (specific gravity) of the glass sample at room temperature and the density (specific gravity) of the glass part at room temperature are assumed to match. That is, the density at room temperature is expressed by attaching the unit g/$cm^3$ to the specific gravity.

(Average Linear Expansion Coefficient an at −30° C. to 70° C.)

With regard to the glass wafer according to the present embodiment, the average linear expansion coefficient an of the glass part at −30° C. to 70° C. is preferably $80\times10^{-6}$ $K^{-1}$ or less, and more preferably $75\times10^{-6}$ $K^{-1}$ or less. The lower limit of the average linear expansion coefficient an of the glass part at −30° C. to 70° C. is not particularly limited; however, the lower limit is usually $60\times10^{-6}$ $K^{-1}$. Even when heating is performed through one surface on a hot plate during the formation of the diffractive optical element part, from the viewpoint of reducing the difference in expansion between the two main surfaces of the glass part and reducing warpage of the glass part, it is preferable that the average linear expansion coefficient an of the glass part at −30° C. to 70° C. is set within the above-described range.

The average linear expansion coefficient an at −30° C. to 70° C. is measured using an interference dilatometer and is calculated by the following expression.

$$\alpha_n = dL_n/(L \times dT_n)$$

In the above expression, $dT_n$ represents the temperature difference (K) at −30° C. to 70° C.; L represents the initial length (mm) of the glass sample; and $dL_n$ represents the amount of change (mm) in the sample length in the temperature range of −30° C. to 70° C.

(Refractive Index Nd)

With regard to the glass wafer according to the present embodiment, the refractive index nd of the glass part is preferably 1.9 or greater, more preferably 1.95 or greater, and even more preferably 2.00 or greater. The upper limit of the refractive index nd of the glass part is not particularly limited; however, the upper limit is usually 2.2. From the viewpoint that light entering the glass part travels through the interior of the glass part while repeatedly undergoing total reflection and is emitted at a sufficient viewing angle, it is preferable that the refractive index of the glass part is set within the above-described range.

(Abbe Number νd)

With regard to the glass wafer according to the present embodiment, the upper limit of the Abbe number νd of the glass part can be set to 40 and can also be set to 35 or 30. The lower limit of the Abbe number νd of the glass part is also not particularly limited; however, the lower limit is usually 15.

(Glass Transition Temperature Tg)

With regard to the glass wafer according to the present embodiment, the glass transition temperature Tg of the glass part is preferably 600° C. or higher, more preferably 630° C. or higher, and even more preferably 650° C. or higher. The upper limit of the glass transition temperature Tg of the glass part is not particularly limited; however, the upper limit is usually 780° C. and is preferably 760° C. When heating the glass part to form a diffractive optical element part on the main surface of the glass part, from the viewpoint of reducing warpage of the glass part and from the viewpoint of satisfactorily maintaining thermal stability of the glass part while maintaining a desired refractive index, it is preferable that the glass transition temperature Tg of the glass part is set within the above-described range.

(Internal Transmittance)

With regard to the glass wafer according to the present embodiment, the glass part has light transmission properties with respect to visible light. The light transmission properties can be evaluated by the internal transmittances at wavelengths of 420 nm to 800 nm in a glass sample having a thickness of 10.0 mm±0.1 mm. The internal transmittance is a transmittance excluding the surface reflection loss on the incident side and emission side of the glass sample. The internal transmittance τ for a thickness of 10.0±0.1 mm at a specific wavelength can be obtained by measuring each of the transmittances (external transmittances) T1 and T2 including the surface reflection loss of two glass samples that are formed of the same kind of glass and have different thicknesses d1 and d2, and calculating the internal transmittance using the following expression.

$$\log\tau = -[(\log T1 - \log T2)\times 10]/\Delta d$$

provided that d2>d1, Δd=d2−d1, and log is the common logarithm.

The internal transmittance of a glass sample formed of the same material as the glass part and having a thickness of 10.0 mm±0.1 mm, that is, the internal transmittance of the glass part converted in terms of a thickness of 10.0 mm±0.1 mm, is preferably 78% or greater, more preferably 83% or greater, and even more preferably 90% or greater, over a wavelength range of 420 nm to 800 nm.

It is preferable that the smallest value of the internal transmittances at wavelengths of 420 nm to 800 nm is the internal transmittance at a wavelength of 420 nm, which is the shorter wavelength end of the wavelength range. That is, the internal transmittance of a glass sample formed of the same material as the glass part and having a thickness of 10.0 mm±0.1 mm (internal transmittance of the glass part converted in terms of a thickness of 10.0 mm±0.1 mm) at a wavelength of 420 nm is preferably 78% or greater, more preferably 83% or greater, and even more preferably 90% or greater.

(Specific Gravity)

With regard to the glass wafer according to the present embodiment, the specific gravity of the glass part is preferably 5.5 or less, more preferably 5.4 or less, and even more preferably 5.3 or less. The lower limit of the specific gravity of the glass part is not particularly limited; however, the lower limit is usually 4.3. In a case where the glass wafer is used for a spectacle lens of smart glasses, from the viewpoint of reducing unpleasant feelings during wearing due to the weight of the lens, it is preferable that the specific gravity of the glass part is set within the above-described range.

(Specific Elastic Modulus)

With regard to the glass wafer according to the present embodiment, the specific elastic modulus of the glass part is preferably 24.0 MN/Kg or greater, more preferably 24.5 MN/Kg or greater, and even more preferably 25.0 MN/Kg or greater. The upper limit of the specific elastic modulus of the glass part is not particularly limited; however, the upper limit is about 30 MN/Kg, as a guideline. When heating the glass part to form a diffractive optical element part on the main surfaces of the glass part, from the viewpoint of reducing warpage of the glass part, it is preferable that the specific elastic modulus of the glass part is set within the above-described range.

Material

With regard to the glass wafer according to the present embodiment, the material of the glass part is not particularly limited as long as the material satisfies the above-described Young's modulus and average linear expansion coefficient an at −30° C. to 70° C. Examples of the material of the glass part include optical glasses. The glass part preferably includes an optical glass.

Specifically, a glass having a B—La-based composition can be taken as an example of the material of the glass part. Thus, non-limiting examples of the B—La-based glass composition will be shown below. Meanwhile, the material of the glass part is not limited to the glass having the B—La-based composition shown below, and any material from which a glass wafer that can reduce warpage during the formation of the diffractive optical element is obtained is acceptable.

The glass part preferably has glass compositions (indicated in % by mass) shown below.

The total content of $B_2O_3$ and $SiO_2$ [$B_2O_3$+$SiO_2$] is preferably 5% to 25%.

The total content of $La_2O_3$, $Gd_2O_3$, $Y_2O_3$, and $Yb_2O$; [$La_2O_3$+$Gd_2O_3$+$Y_2O_3$+$Yb_2O_3$] is preferably 25% to 68%.

The total content of $TiO_2$, $Nb_2O_5$, $Ta_2O_5$, and $WO_3$ [$TiO_2$+$Nb_2O_5$+$Ta_2O_5$+$WO_3$] is preferably 5% to 40%.

The total content of MgO, CaO, SrO, and BaO [MgO+CaO+SrO+BaO] is preferably 0% to 20%.

The total content of $Li_2O$, $Na_2O$, and $K_2O$ [$Li_2O$+$Na_2O$+$K_2O$] is preferably 0% to 5%.

The content of $ZrO_2$ is preferably 0% to 12%.

The content of ZnO is preferably 0% to 10%.

The content of $B_2O_3$ is preferably 3% to 20%.

The content of $SiO_2$ is preferably 0% to 15%.

The content of $La_2O_3$ is preferably 25% to 60%.

The content of $Gd_2O_3$ is preferably 0% to 30%.

The content of $Y_2O_3$ is preferably 0% to 16%.

The content of $Yb_2O_3$ is preferably 0% to 5%.

The content of TiO is preferably 0% to 28%.

The content of $Nb_2O_5$ is preferably 0% to 15%.

The content of $Ta_2O_5$ is preferably 0% to 10%.

The content of $WO_3$ is preferably 0% to 6%.

The content of MgO is preferably 0% to 5%.

The content of CaO is preferably 0% to 5%.

The content of SrO is preferably 0% to 5%.

The content of BaO is preferably 0% to 20%.

The content of $Li_2O$ is preferably 0% to 5%.

The content of $Na_2O$ is preferably 0% to 5%.

The content of $K_2O$ is preferably 0% to 5%.

The content of $Sb_2O_3$ is preferably 0% to 1%.

The content of $Lu_2O_3$ is preferably 0% to 1%.

The content of $Sc_2O_3$ is preferably 0% to 1%.

The content of $Ga_2O_3$ is preferably 0% to 1%.

The content of $GeO_2$ is preferably 0% to 1%.

From the viewpoint of increasing the Young's modulus in the glass part, it is preferable that the total content [$La_2O_3$+$Gd_2O_3$+$Y_2O_3$+$Yb_2O_3$], the content of $ZrO_2$, and the content of TiO are set within the above-described ranges. Furthermore, from the viewpoint of suppressing an increase in the average linear expansion coefficient, it is preferable that the total content [MgO+CaO+SrO+BaO] and the total content [$Li_2O$+$Na_2O$+$K_2O$] are set within the above-described ranges.

It is preferable that the glass part does not include Pb, Te, Cd, Th, Tl, V, Cr, Ni, Fe, U, Nd, Cu, Er, Eu, and the like.

<Diffractive Optical Element Part>

The glass wafer according to the present embodiment has a diffractive optical element part on two main surfaces of the glass part. The diffractive optical element part is not particularly limited as long as it includes one having a function of diffraction grating. For example, the diffractive optical element part includes a diffraction grating having a function of diffracting a light (image) entering from an image light source into the glass part, that is, a diffractive optical element for light incidence, or a diffraction grating having a function of diffracting a light traveling through the glass part by total reflection and emitting the light to the outside, that is, a diffractive optical element for light emission. In this case, on the glass wafer, a diffractive optical element for incidence and a diffractive optical element for emission are formed in each region that becomes a light guide plate after cutting and separation by dicing. Since the light beam before entering the light guide plate is thin, the area of the diffractive optical element for incidence only needs to be relatively small. On the other hand, since the diffractive optical element for emission enlarges and displays an image in front of the pupils of the person wearing the image display device, the area of the diffractive optical element is relatively large. As the viewing angle is larger, the area of the diffractive optical element for emission becomes larger.

With regard to the glass wafer according to the present embodiment, the shape of the diffraction grating in the diffractive optical element part is not particularly limited. Therefore, the diffraction grating may be a diffraction grating having a grooved shape or may be a so-called holographic diffraction grating utilizing holography. For example, the diffractive optical element part may have a periodic uneven structure as the diffraction grating. In this case, from the viewpoint that a light (image) incident from an image light source travels through the interior of the glass part while repeatedly undergoing total reflection, and furthermore, from the viewpoint that the light is emitted at a sufficiently wide viewing angle, the period of the uneven structure is preferably 500 nm or less, and more preferably 400 nm or less, and may also be 280 nm or less.

The material of the diffractive optical element part is not particularly limited and may be an inorganic material or an organic material. From the viewpoint of maintaining light transmission properties as a spectacle lens of smart glasses, it is preferable that the material is a transparent material. Examples of the inorganic material include titanium oxide, silicon nitride, and silicon carbide; however, the inorganic material is not limited to these. In films of titanium oxide, silicon nitride, silicon carbide, and the like, the molar ratios of elements such as Ti, Si, O, N, and C are not necessarily integer ratios (non-stoichiometry). Thus, it should be noted that in the present specification, the inorganic material of the diffractive optical element part will be described as titanium oxide, silicon nitride, silicon carbide, or the like, which includes both a material in a stoichiometric ratio and a material in non-stoichiometric ratios. Examples of the organic material include transparent resins, and for example, the organic material may be an ultraviolet-curable resin.

A large number of light guide plates can be manufactured by cutting and separating the glass wafer according to the present embodiment by dicing.

Light Guide Plate

A light guide plate according to the present embodiment has a glass part and a diffractive optical element part on two main surfaces of the glass part.

The light guide plate according to the present embodiment inherits the properties of the glass wafer as they are, and the properties of the glass part and the diffractive optical element part of the glass wafer can be considered the same as the properties of the glass part and the diffractive optical element part of the light guide plate.

Particularly, with regard to the light guide plate according to the present embodiment, the thickness of the glass part is 3.0 mm or less, preferably 1.0 mm or less, more preferably 0.8 mm or less, and even more preferably 0.5 mm or less. The lower limit of the thickness of the glass part is not particularly limited; however, the lower limit is usually 0.2 mm, and preferably 0.25 mm.

Furthermore, with regard to the light guide plate according to the present embodiment, the Young's modulus of the glass part is 100 GPa or greater, preferably 110 GPa or greater, and more preferably 120 GPa or greater. The upper limit of the Young's modulus of the glass part is not particularly limited; however, the upper limit is usually 150 GPa, and preferably 140 GPa.

With regard to the glass part and the diffractive optical element part of the light guide plate according to the present embodiment, properties other than the above-described ones, that is, the average linear expansion coefficient αn at −30° C. to 70° C., refractive index nd, Abbe number νd, glass transition temperature Tg, internal transmittance, specific gravity, specific elastic modulus, and material of the glass part, as well as the type, shape, period of the diffraction grating, material, and the like of the diffractive optical element part can be considered the same as the properties of the glass part and the diffractive optical element part of the glass wafer.

Image Display Device

An image display device according to the present embodiment includes the above-mentioned light guide plate.

In the following description, the light guide plate according to an aspect of the present invention and an image display device using the light guide plate will be described in detail with reference to the drawings. Meanwhile, the same or equivalent parts in the drawings will be assigned with the same reference numerals, and further description thereof will not be repeated.

FIG. 1 is a diagram illustrating a configuration example of a head-mounted display 1 (hereinafter, abbreviated to "HMD1") using a light guide plate 10 according to an aspect of the present invention, and FIG. 1(*a*) is a front side perspective view of the HMD1, while FIG. 1(*b*) is a rear side perspective view of the HMD1. As shown in FIG. 1(*a*) and FIG. 1(*b*), spectacle lenses 3 are attached to the frontal part of a spectacle-type frame 2 that is mounted on the head portion of a user. A backlight 4 for illuminating an image is attached to the attachment part 2*a* of the spectacle-type frame 2. At temple portions of the spectacle-type frame 2, a signal processing instrument 5 for projecting an image, and a speaker 6 for reproducing sound are provided. Flexible printed circuits (FPC) 7 constituting the wiring drawn out from circuit of the signal processing instrument 5 are wired along the spectacle-type frame 2. A display element unit (for example, a liquid crystal display element) 20 is wired to the central positions of both pupils of the user by the FPC 7, and is held such that an approximately central part of the display element unit 20 is disposed on the optical axis line of the backlight 4. The display element unit 20 is fixed relative to the light guide plate 10 so as to be located approximately at the center part of the light guide plate 10. Furthermore, holographic optical elements (HOEs) 32R and 32L (first diffractive optical elements) are formed on a first surface 10*a* of the light guide plate 10, respectively at sites located in front of the user's pupils. HOEs 52R and 52L are formed on a second surface 10*b* of the light guide plate 10 at positions facing the display element unit 20, with the light guide plate 10 being interposed therebetween.

FIG. 2 is a lateral view schematically illustrating the configuration of the HMD1 according to an aspect of the present invention. In FIG. 2, only the essential parts of the image display device are indicated in order to make the drawing obvious, and the spectacle-type frame 2 and the like are not shown. As shown in FIG. 2, the HMD1 has a laterally symmetric structure about the central line X that connects the centers of the image display element 24 and the light guide plate 10. Furthermore, light at each wavelength, which has entered the light guide plate 10 from the image display element 24, is divided into two portions, which are then respectively guided to the right-side eye and the left-side eye of the user, as will be described below. The light paths of the light at each wavelength to be guided to each eye are also approximately laterally symmetric about the central line X.

As shown in FIG. 2, the backlight 4 has a laser light source 21, a diffuse optical system 22, and a microlens array 23. The display element unit 20 is an image forming unit having an image display element 24 and is driven by, for example, a field sequential method. The laser light source 21 has a laser light source corresponding to each wavelength of R (wavelength 633 nm), G (wavelength 546 nm), and B (wavelength 436 nm), and sequentially irradiates light of each wavelength at high speed. The light of each wavelength enters the diffuse optical system 22 and the microlens array 23, is converted into a uniform, highly directional, parallel light beam with no unevenness in the amount of light, and is incident perpendicularly on the display panel surface of the image display element 24.

The image display element 24 is, for example, a transmissive liquid crystal (LCDT-LCOS) panel driven by a field sequential method. The image display element 24 applies modulation to the light of each wavelength according to an image signal generated by an image engine (not shown) of the signal processing instrument 5. The light of each wavelength modulated by pixels in an effective region of the image display element 24 enters the light guide plate 10 with a predetermined light beam cross-section (a shape approximately the same as this effective region). The image display element 24 can be replaced with a display element of other form such as, for example, a digital mirror device (DMD), a reflective liquid crystal (LCOS) panel, a micro electro mechanical system (MEMS), an organic electro-luminescence (EL), or an inorganic EL.

The display element unit 20 is not limited to a display element of the field-sequential type but may be an image forming unit of a simultaneous-type display element (a display element having a predetermined arrangement of RGB color filters on the front side of the exit surface). In this case, for example, a white light source is used as the light source.

As shown in FIG. 2, the light of each wavelength modulated by the image display element 24 sequentially enters the interior of the light guide plate 10 through the first surface 10*a*. On the second surface 10*b* of the light guide plate 10, HOEs 52R and 52L (second diffractive optical elements) are formed. The HOEs 52R and 52L are, for example, reflective, volume phase-type HOEs having a rectangular shape, and have a configuration in which three sheets of photopolymers are laminated, on each of which interference fringes corresponding to the light of each wavelength of R, G, and B are recorded. That is, the HOEs 52R and 52L are configured to have a wavelength selection function of diffracting light of each wavelength of R, G, and B and transmitting light of other wavelengths.

The HOEs 32R and 32L are also reflective, volume phase-type HOEs and have the same layer structure as the HOEs 52R and 52L. The HOEs 32R and 32L and the HOEs 52R and 52L may have, for example, substantially the same pitch of the interference fringe patterns.

The HOEs 52R and 52L are stacked in a state in which the centers of the elements coincide with each other while the interference fringe patterns are reversed by 180 degrees. Then, the HOEs 52R and 52L are formed on the second surface 10*b* of the light guide plate 10 such that their centers coincide with the center line X in the stacked state. Light of each wavelength modulated by the image display element 24 is sequentially made incident on the HOEs 52R and 52L through the light guide plate 10.

Each of the HOEs 52R and 52L diffracts the sequentially incident light of each wavelength at a predetermined angle in order to guide the light to the right eye and the left eye. The light of each wavelength diffracted by the HOEs 52R and 52L propagates inside the light guide plate 10 by repeatedly undergoing total reflection at the interface between the light guide plate 10 and air, and enters the HOEs 32R and 32L. Here, the HOEs 52R and 52L give the same diffraction angle to the light of each wavelength. Therefore, the light of all wavelengths having substantially the same incident position on the light guide plate 10 (or, in other words, emitted from substantially the same coordinates within the effective region of the image display element 24) propagates along substantially the same optical path inside the light guide plate 10 and are then made incident at substantially the same position on the HOEs 32R and 32L. According to another viewpoint, the HOEs 52R and 52L diffract the light of each wavelength of RGB such that the pixel positional relationship within an effective region of the image displayed in an effective region of the image display element 24 is faithfully reproduced on the HOEs 32R and 32L.

In this way, according to an aspect of the present invention, the HOEs 52R and 52L diffract the light of all wavelengths emitted from substantially the same coordinates within the effective region of the image display element 24 such that the light is made incident at substantially the same position on the HOEs 32R or 32L, respectively. Alternatively, the HOEs 52R and 52L may also be configured to diffract the light of all wavelengths that originally forms the same pixel that is relatively shifted within the effective region of the image display element 24, so as to cause the light to be incident at substantially the same position on the HOEs 32R or 32L.

The light of each wavelength incident on the HOEs 32R or 32L is diffracted by the HOEs 32R or 32L and is sequentially emitted approximately perpendicularly to the outside through the second surface 10*b* of the light guide plate 10. The light of each wavelength emitted as substantially parallel light in this way forms an image on the user's right eye retina and left eye retina, respectively, as a virtual image I of the image generated by the image display element 24. Furthermore, the HOEs 32R and 32L may be provided with a capacitor action so that the user can observe the virtual image I of an enlarged image. That is, light may be emitted at an angle such that the light incident on the peripheral region of the HOEs 32R and 32L approaches closer to the center of the pupil, and caused to form an image on the user's retinas. Alternatively, in order to allow the user to observe the virtual image I of the enlarged image, the HOEs 52R and 52L may be arranged to diffract light of each wavelength of RGB such that the pixel positional relationship on the HOE 32R and 32L forms a similar shape enlarged with respect to the pixel positional relationship within the effective region of the image displayed in the effective region of the image display element 24.

Since the air-equivalent optical path length of light traveling through the light guide plate 10 becomes shorter as the refractive index increases, the apparent viewing angle with respect to the width of the image display element 24 can be increased by using the light guide plate according to the present embodiment having a glass part with a high refractive index. In addition, according to the present embodiment, since the refractive index of the glass part is high while the specific gravity is suppressed to a low level, a light guide plate that is lightweight and yet provides the above-described effects can be provided.

A head-mounted display has been described above as an example of the image display device; however, the image display device according to the present embodiment may be spectacle-type smart glasses. Furthermore, other image display devices may also be used. Furthermore, the diffractive optical element may be a diffraction grating having a fine periodic uneven structure instead of a holographic diffraction grating. In the above-described example, a binocular light guide plate has been described; however, it is also allowable to use separate light guide plates for displaying an image for the left eye and the right eye.

<Manufacture of Glass Wafer>

The glass wafer according to the present embodiment can be manufactured by manufacturing a glass part and forming a diffractive optical element part on two main surfaces of the glass part.

The glass part can be manufactured using, for example, a glass molded body. Production of a glass molded body including an optical glass will be described below as an example.

The optical glass may be manufactured by compounding glass raw materials to have a predetermined composition and using the compounded glass raw materials according to a known glass manufacturing method. For example, a plurality of kinds of compounds are compounded and sufficiently mixed to obtain a batch raw material, and the batch raw material is placed in a quartz crucible or a platinum crucible and roughly melted (rough melting). The molten material obtained by rough melting is rapidly cooled and pulverized to produce cullet. Furthermore, the cullet is placed in a platinum crucible, heated, and remelted to obtain molten glass, and after fining and homogenization, the molten glass is molded and slowly cooled to obtain a glass molded body to be an optical glass. Known methods may be applied to the molding and slow cooling of the molten glass.

The compounds used when compounding the batch raw material are not particularly limited as long as desired glass components can be introduced into the glass so as to reach desired contents, and examples of such compounds include oxides, carbonates, nitrates, hydroxides, and fluorides.

The glass part can be manufactured by a method including a step of processing the glass molded body. Examples of processing include cutting, machining, rough grinding, fine grinding, and polishing.

Furthermore, the glass part can also be manufactured by, for example, the following method.

A glass material formed of an optical glass is produced by a known method, by melting glass raw materials at a predetermined composition to obtain molten glass, pouring this molten glass into a mold to be formed into a plate shape. The obtained glass material is appropriately cut, ground, and polished, and a cut piece having a size and shape suitable for press-molding is produced. The cut piece is heated, softened, and then press-molded (reheat pressing) by a known method, and a glass blank approximating the shape of the glass part is produced. The glass blank is annealed and is ground and polished by known methods to manufacture the glass part.

A glass wafer can be manufactured by forming a diffractive optical element part on two main surfaces of the glass part. The method of forming the diffractive optical element part is not particularly limited. For example, a case in which the diffractive optical element part is formed from an organic material, and a case in which the diffractive optical element part is formed from an inorganic material will be described below with examples. In a case where a holographic diffraction grating is employed as the diffractive optical element part, the holographic diffraction grating may be formed by a known method.

When forming the diffractive optical element part from an organic material, the organic material is applied on one main surface of the glass part to form a coating film, and a mold having an inverted shape of the diffraction grating pattern of the diffractive optical element part is transferred to the coating film. Thereafter, the resultant is heated to approximately 125° C. and fired, and a glass wafer in which a diffractive optical element part is formed at a predetermined position on one main surface (front surface) of a glass part can be manufactured. Thereafter, a diffractive optical element part is further formed on the other main surface (back surface) by a similar method. A glass wafer in which a diffractive optical element part is formed at predetermined positions of two main surfaces of a glass part can be manufactured. Examples of the organic material include, but are not limited to, a transparent resin, and the organic material may be, for example, an ultraviolet-curable resin.

When forming the diffractive optical element part from an inorganic material, an inorganic material film is formed on one main surface of the glass part in a vacuum chamber by sputtering, vapor deposition, or chemical vapor deposition (CVD). After film formation, the resultant is taken out from the vacuum chamber, a photoresist is applied thereon, and the resultant is subjected to prebaking, exposure, post-baking (about 120° C. to 150° C.), development, and etching to form a diffraction grating pattern. As a result, a glass wafer in which a diffractive optical element part is formed at a predetermined position of one main surface (front surface) of a glass part can be manufactured. Thereafter, a diffractive optical element part is further formed on the other main surface (back surface) by a similar method. A glass wafer in which a diffractive optical element part is formed at predetermined positions of two main surfaces of a glass part can be manufactured. Examples of the inorganic material include titanium oxide, silicon nitride, and silicon carbide; however, the inorganic material is not limited to these.

<Manufacture of Light Guide Plate>

A method of manufacturing the light guide plate is not particularly limited, and the light guide plate can be manufactured by a known method. For example, a plurality of light guide plates can be manufactured by subjecting a glass wafer on which a diffractive optical element part has been formed as described above, to cutting and separating by dicing. When cutting and separating the glass wafer, an anti-reflection film is formed on the main surfaces of the glass wafer, a protective sheet is pasted thereon with an ultraviolet-removable adhesive to protect the main surfaces of the wafer, and after cutting and separating, the protective sheet may be peeled off by irradiating the protective sheet with ultraviolet radiation.

<Manufacture of Image Display Device>

A method of manufacturing an image display device is not particularly limited, and an image display device can be manufactured by a known method. For example, in the case of a spectacle-type image display device, the image display device can be manufactured by incorporating the above-described light guide plate into a head-mounted display 1 shown in FIG. 2, that is, by mounting the above-described light guide plate together with a light source and an optical system into a frame.

EXAMPLES

Hereinafter, the present invention will be described in more detail by way of Examples. However, the present invention is not intended to be limited to the aspects described in Examples.

Example 1

Glass wafers each including a glass part formed of glass A, B, or C as shown in Table 1 were produced according to the following procedure, and various evaluations were performed.

[Preparation of Glass Sample]

Compound raw materials corresponding to the constituent components of the glass part, that is, raw materials such as oxides and carbonates, were weighed and thoroughly mixed to obtain a compounded raw material. This compounded raw material was put into a platinum crucible, heated to 1000° C. to 1350° C. to melt in an air atmosphere or a steam atmosphere, and homogenized and fined by stirring to obtain molten glass. This molten glass was cast into a mold to be molded and was slowly cooled to obtain a glass sample. The glass melted in a steam atmosphere was heat-treated in an air atmosphere for a long period of time to increase the transmittance in the visible range.

[Measurement of Optical Properties]

For the obtained glass sample, the refractive index nd, Abbe number vd, glass transition temperature Tg, Young's modulus, average linear expansion coefficient an, specific gravity, specific elastic modulus, and internal transmittances (values converted in terms of a thickness of 10.0 mm) at wavelengths of 420 nm and 800 nm were measured. The results are shown in Table 1.

[Refractive Index Nd and Abbe Number νd]

The refractive indices nd, ng, nF, and nC were measured by the refractive index measurement method of JIS standard JIS B 7071-1, and the Abbe number νd was calculated based on the following expression.

$$\nu d=(nd-1)/(nF-nC)$$

[Glass Transition Temperature Tg]

The glass transition temperature Tg was measured using a differential scanning calorimetry analyzer (DSC3300SA) manufactured by NETZSCH Japan K.K. at a temperature increase rate of 10° C./min.

[Young's Modulus]

The Young's modulus was measured according to JIS R 1602-1995 and calculated. Specifically, a glass sample was processed into a size of 20 mm in length, 20 mm in width, and 100 mm in height, sufficiently annealed, and placed in a constant-temperature chamber, the longitudinal wave velocity (Vl) and the shear wave velocity (Vs) of 5 MHz ultrasonic waves were measured, and the Young's modulus (E) and the rigidity modulus (G) were calculated by the following expressions, respectively.

$$E=(4G^2-3G\times Vl^2\times\rho)/(G-Vl^2\times\rho)$$

$$G=Vs^2\times\rho$$

In the above expressions, ρ represents the density of the glass sample, and the value of specific gravity was used as ρ.

[Average Linear Expansion Coefficient $\alpha_n$ at −30° C. to 70° C.]

The average linear expansion coefficient $\alpha_n$ at −30° C. to 70° C. was measured using an interference dilatometer and was calculated by the following expression.

$$\alpha_n=dL_n/(L\times dT_n)$$

In the above expression, $dT_n$ represents the temperature difference (K) at −30° C. to 70° C.; L represents the initial length (mm) of the glass sample; and $dL_n$ represents the amount of change (mm) in the sample length in the temperature range of −30° C. to 70° C.

[Specific Gravity]

The specific gravity was measured by the Archimedes method.

[Specific Elastic Modulus]

The specific elastic modulus was calculated by dividing the Young's modulus by the density at room temperature. The density at room temperature is indicated by attaching a unit (g/cm$^3$) to the specific gravity.

[Internal Transmittance]

The glass sample was processed to have optically polished planes that were parallel to each other, with a thickness of 10 mm±0.1 mm, and the internal transmittances at a wavelength of 420 nm and a wavelength of 800 nm were measured. The internal transmittance τ was obtained by measuring the transmittances (external transmittances) T1 and T2 including the surface reflection loss of two glass samples that were formed from the same glass sample and had different thicknesses d1 and d2, and calculating the internal transmittance τ using the following expression.

$$\log\tau = -[(\log T1 - \log T2)\times 10]/\Delta d$$

provided that d2>d1, Δd=d2−d1, and log is the common logarithm.

TABLE 1

| | | Glass A | Glass B | Glass C |
|---|---|---|---|---|
| Glass composition (% by mass) | $B_2O_3$ | 9.21 | 8.00 | 6.86 |
| | $SiO_2$ | 4.72 | 6.00 | 4.08 |
| | $La_2O_3$ | 49.40 | 34.00 | 46.44 |
| | $Gd_2O_3$ | 7.58 | 0.00 | 9.26 |
| | $Y_2O_3$ | 0.56 | 0.00 | 0.55 |
| | $Yb_2O_3$ | 0.00 | 0.00 | 0.00 |
| | $ZrO_2$ | 5.84 | 6.50 | 6.67 |
| | $TiO_2$ | 13.35 | 20.50 | 16.22 |
| | $Nb_2O_5$ | 7.94 | 8.00 | 9.15 |
| | $Ta_2O_5$ | 0.00 | 0.00 | 0.00 |
| | $WO_3$ | 0.00 | 0.00 | 0.00 |
| | MgO | 0.00 | 0.00 | 0.00 |
| | CaO | 0.00 | 0.00 | 0.00 |
| | SrO | 0.00 | 0.00 | 0.00 |
| | BaO | 0.00 | 15.00 | 0.00 |
| | ZnO | 1.40 | 2.00 | 0.77 |
| | $Li_2O$ | 0.00 | 0.00 | 0.00 |
| | $Na_2O$ | 0.00 | 0.00 | 0.00 |
| | $K_2O$ | 0.00 | 0.00 | 0.00 |
| | Total | 100.00 | 100.00 | 100.00 |
| | $B_2O_3 + SiO_2$ | 13.93 | 14.00 | 10.94 |
| | $La_2O_3 + Gd_2O_3 + Y_2O_3 + Yb_2O_3$ | 57.54 | 34.00 | 56.25 |
| | $TiO_2 + Nb_2O_5 + Ta_2O_5 + WO_3$ | 21.29 | 28.50 | 25.37 |
| | MgO + CaO + SrO + BaO | 0.00 | 15.00 | 0.00 |
| | $Li_2O + Na_2O + K_2O$ | 0.00 | 0.00 | 0.00 |
| Properties | Young's modulus (Gpa) | 130 | 121 | 136 |
| | Specific gravity | 5.12 | 4.73 | 5.27 |
| | Specific elastic modulus (MN/kg) | 25.39 | 25.58 | 25.81 |
| | Average linear expansion coefficient −30° C. to 70° C. ($\times10^{-6}K^{-1}$) | 73 | 72 | 73 |
| | Refr active index nd | 2.00165 | 2.0003 | 2.0521 |
| | Abbe number νd | 29.05 | 25.51 | 26.73 |
| | Internal transmittance (wavelength 420 nm, thickness 10.0 mm) | 93.50% | 91.40% | 78.10% |
| | Internal transmittance (wavelength 800 nm, thickness 10.0 mm) | 99.90% | 99.80% | 99.70% |
| | Glass transition temperature Tg (° C.) | 709 | 688 | 743 |

[Production of Glass Wafer]

The above-described glass sample was cut, ground, and polished to produce a disk-shaped glass part. The area and diameter of one main surface, and the thickness of the glass part are shown in Table 2. Furthermore, the flatness of the glass part before formation of a diffractive optical element part was evaluated using BOW. In addition, it was confirmed that warpage of the glass part was reduced when forming a diffractive optical element part.

[Flatness (BOW) Before Formation of Diffractive Optical Element Part]

The flatness was evaluated by BOW. For the measurement of BOW, a flatness measuring device Flat Master MSP300 manufactured by Corning Tropel Corporation was used. For the measurement of the BOW, a known method, for example, a non-contact-type BOW measuring device can be used, and the standard regarding the BOW measurement of the American Society for Testing and Materials standard ASTM F534 can be applied mutatis mutandis. Specifically, the glass part was supported at three points arranged at equal intervals (120° intervals) on the circumference of an imaginary circle having a diameter slightly smaller than the diameter of the glass part. In this case, the center of the glass part and the center of the imaginary circle were aligned in a vertical direction, and the glass part was not fixed (clamped). The deviation of the center point of the central surface of the glass part from a virtual plane (referred to as central surface reference plane) including the three points supporting the glass part was designated as BOW.

As shown in FIG. 3, the central surface is a virtual plane that is equidistant from the two main surfaces of the glass part and is inside the glass part. When the center point of the central surface of the glass part is above the central surface reference plane, the BOW has a positive value. On the other hand, when the center point of the central surface of the glass part is below the central surface reference plane, the BOW has a negative value. As the absolute value of the BOW is larger, the curvature of the glass part is larger.

[Evaluation of Warpage of Glass Part when Forming Diffractive Optical Element Part]

When a plurality of diffractive optical element parts are formed all at once on a main surface of the glass part, it is required that the dimensional accuracy and the positional accuracy of all the diffractive optical element parts fall within allowable ranges. Warpage of the glass part becomes a factor that reduces the above-described dimensional accuracy and positional accuracy. The influence of warpage of the glass part on the dimensional accuracy and positional accuracy of the diffractive optical element part will be described below. The BOW value is used to quantitatively express the warpage (flatness) of the glass part.

A disk-shaped glass part having a diameter Φ (mm) will be described. An area in which the diffractive optical element part is formed on a main surface of the glass part is referred to as an effective area. As shown in FIG. 4, the effective area is an area surrounded by a circle A having the radius of [(Φ/2)−5 mm] from the center.

As shown in FIGS. 5(1) and 5(2), when assuming a central surface reference plane for the circle A, [(Φ/2)−5 mm] is an effective area length c. That is, the effective area length c is expressed by the following expression.

$$c = (\Phi/2) - 5\text{ mm}$$

When the glass part is viewed in a plan view from the direction of the central axis, the distance from the center of the glass part to the circumference of the circle A is referred to as a run length b. The following expression holds between the BOW value a, the run length b, and the effective area length c.

$$a^2 + b^2 = c^2$$

From the above, the following expression is valid.

$$b = [c^2 - a^2]^{1/2} = [\{(\Phi/2) - 5\text{ mm}\}^2 - a^2]^{1/2}$$

That is, the difference (amount of deviation) between the effective area length c and the run length b is expressed as follows.

$$c-b=\left[(\Phi/2)-5\text{ mm}\right]-\left[\{(\Phi/2)-5\text{ mm}\}^2-a^2\right]^{1/2}$$

When a plurality of diffractive optical element parts are formed by photolithography on the main surfaces of the glass part, the BOW value becomes the largest in the vicinity of the circumference of the circle A representing the effective area, and as a result, misregistration becomes the largest. Due to this misregistration, there occurs an error in the period (pitch) of the uneven structure of the diffraction grating included in the diffraction optical element part.

In order to maintain the performance of the diffractive optical element part, it is required to suppress the error in the period of the uneven structure of the diffraction grating to be within ±5%. As the period of the uneven structure of the diffraction grating is smaller, it is more difficult to suppress the error to a low level.

For example, when the period of the uneven structure of the diffraction grating is 150 nm, 5% of the period is 7.5 nm. That is, "7.5 nm" is the maximum allowable value of the error in the period of the uneven structure of the diffraction grating. Even in a case where warping occurs in the glass part, when the above-described amount of deviation [c-b] is "7.5 nm" or less, the error in the period of the uneven structure of the diffraction grating can be suppressed to be within ±5%. On the other hand, when the amount of deviation [c-b] is more than "7.5 nm", the error in the period of the uneven structure of the diffraction grating is more than ±5%. On such a highly warped glass part, the diffractive optical element part cannot be formed with high precision.

The amount of deviation in a case where the period of the uneven structure of the diffraction grating is 150 nm will be specifically described. When the diameter of the glass part is 200 mm, and the BOW value is 44 μm, since the amount of deviation [c-b] is more than 7.5 nm, the error in the period of the uneven structure of the diffraction grating included in the diffraction optical element part in the vicinity of the circumference of the circle A exceeds the maximum allowable value. On such a glass part, the diffractive optical element part cannot be formed with high precision.

Similarly, when the diameter of the glass part is 250 mm while the BOW value is 55 μm, and when the diameter of the glass part is 300 mm while the BOW value is 66 μm, since the amount of deviation [c-b] is more than 7.5 nm in both cases, the error in the period of the uneven structure of the diffraction grating included in the diffractive optical element part in the vicinity of the circumference of the circle A in each case exceeds the maximum allowable value. On such a glass part, the diffractive optical element part cannot be formed with high precision.

As shown in Tables 2(1) to 2(3), since the BOW value is 10 μm to 30 μm before formation of the diffractive optical element part, the error in the period of the uneven structure of the diffraction grating can be suppressed to be within ±5%.

A diffractive optical element part was formed on the produced glass part by the following method, and a glass wafer was obtained. At this time, the warpage of the glass part during heating was sufficiently small. Furthermore, the BOW value of the glass wafer after formation of the diffractive optical element part was also sufficiently small to the extent that the error in the period of the uneven structure of the diffraction grating could be suppressed to be within ±5%. That is, it was verified that a diffractive optical element part could be formed with high precision over the entire effective area of the glass part. For the glass wafer obtained by forming the diffractive optical element part, the period of the uneven structure of the diffraction grating and the level difference between protruding parts and recessed parts of the diffraction grating were measured. The results are shown in Table 2.

[Formation Using Organic Material]

A siloxane polymer was applied as an organic material on one main surface of the glass part to form a coating film, and a mold having an inverted shape of the diffraction grating pattern of the diffractive optical element part was transferred onto the coating film. Thereafter, the resultant was heated to approximately 125° C. and fired, and a diffractive optical element part having the size shown in Table 2 was formed at a predetermined position on one main surface of the glass part. Next, a siloxane polymer was applied as an organic material on the other main surface to form a coating film, and the mold having an inverted shape of the diffraction grating pattern of the diffractive optical element part was transferred onto the coating film. Thereafter, the resultant was heated to approximately 125° C. and fired, and a diffractive optical element part having the size shown in Table 2 was formed at a predetermined position on the other main surface of the glass part. Thus, a glass wafer in which a diffractive optical element part was formed on two main surfaces was obtained.

[Formation Using Inorganic Material]

Any of a titanium oxide film, a silicon nitride film, or a silicon carbide film was formed by sputtering on one main surface of the glass part in a vacuum chamber. After film formation, the resultant was taken out from the vacuum chamber, and a photoresist solution was uniformly applied on the main surface of the glass part where the film was formed. Next, the glass part was heated, the solvent of the photoresist was evaporated (prebaking), and a photomask provided with a pattern corresponding to the periodic microstructure pattern of the diffractive optical element was used to transfer the pattern of the photomask onto the photoresist on the surface of the glass part by ultraviolet irradiation (exposure). After the exposure, the photoresist was selectively removed using a liquid developer (development), and the photoresist and the glass part were heated together to about 120° C. to 150° C. in order to thermally crosslink the photoresist (post-baking). Next, the film on the main surface of the glass part was selectively etched to form a diffractive optical element part. Thereafter, a diffractive optical element part was formed at a predetermined position on the other main surface by a similar method. In this way, a glass wafer on which a diffractive optical element part having the size shown in Table 2 was formed was obtained.

[Period (Pitch) of Uneven Structure of Diffraction Grating]

The period was measured by scanning electron microscopy (SEM).

[Level Difference Between Protruding Parts and Recessed Parts of Diffraction Grating]

The level difference was measured by atomic force microscopy (AFM).

Example 2

The glass wafer produced in Example 1 was cut and separated by dicing, and a plurality of light guide plates were produced. The size and the number of light guide plates obtained from one sheet of the glass wafer are shown in Table 2.

Example 3

The light guide plate produced in Example 2 was incorporated into the head-mounted display 1 shown in FIG. 2. That is, the light guide plate produced in Example 2 was mounted together with a light source and an optical system on a frame, and a spectacle-type image display device was produced. When this image display device was worn, and images were displayed, images could be displayed with high image quality and high FOV, and a sufficient sense of immersion was obtained.

TABLE 2

| | No. | 1 | 2 | 3 | 4 | 5 | 6 |
|---|---|---|---|---|---|---|---|
| Glass part | Material | Glass A | | | | | |
| | Diameter (mm) | 200 | 300 | 200 | 300 | 300 | 300 |
| | Area of one main surface (mm$^2$) | 31400 | 70650 | 31400 | 70650 | 70650 | 70650 |
| | Thickness (mm) | 0.3 | 0.3 | 0.3 | 0.3 | 0.3 | 0.3 |
| | BOW before formation of diffractive optical element part | 10 μm | 30 μm | 10 μm | 30 μm | 30 μm | 30 μm |
| Diffractive optical element part (organic material) | Material name | Siloxane polymer | Siloxane polymer | | | | |
| | Film thickness (nm) | 300 to 500 | 300 to 500 | | | | |
| | Heating temperature in diffractive optical element part forming step (° C.) | 125 | 125 | | | | |
| | Pitch of diffraction grating (nm) | 150 to 500 | 150 to 500 | | | | |
| | Level difference between protruding parts and recessed parts of diffraction grating (nm) | 20 to 300 | 20 to 300 | | | | |
| Diffractive optical element part (inorganic material) | Material name | | | Titanium oxide | Titanium oxide | Silicon nitride | Silicon carbide |
| | Film thickness (nm) | | | 300 to 500 | 300 to 500 | 300 to 500 | 300 to 500 |
| | Heating temperature in diffractive optical element part forming step (° C.) | | | 120 to 150 | 120 to 150 | 120 to 150 | 120 to 150 |
| | Pitch of diffraction grating (nm) | | | 150 to 500 | 150 to 500 | 150 to 500 | 150 to 500 |
| | Level difference between protruding parts and recessed parts of diffraction grating (nm) | | | 150 to 300 | 150 to 300 | 20 to 300 | 20 to 300 |
| Number of acquired light guide plates (pieces/one sheet of wafer) | | 10 | 24 | 10 | 24 | 24 | 24 |
| Size of light guide plate | | 40 mm × 50 mm × 0.3 mm | | | | | |
| | No. | 7 | 8 | 9 | 10 | 11 | 12 |
| Glass part | Material | Glass B | | | | | |
| | Diameter (mm) | 200 | 300 | 200 | 300 | 300 | 300 |
| | Area of one main surface (mm$^2$) | 31400 | 70650 | 31400 | 70650 | 70650 | 70650 |
| | Thickness (mm) | 0.3 | 0.3 | 0.3 | 0.3 | 0.3 | 0.3 |
| | BOW before formation of diffractive optical element part | 10 μm | 30 μm | 10 μm | 30 μm | 30 μm | 30 μm |
| Diffractive optical element part (organic material) | Material name | Siloxane polymer | Siloxane polymer | | | | |
| | Film thickness (nm) | 300 to 500 | 300 to 500 | | | | |
| | Heating temperature in diffractive optical element part forming step (° C.) | 125 | 125 | | | | |
| | Pitch of diffraction grating (nm) | 150 to 500 | 150 to 500 | | | | |
| | Level difference between protruding parts and recessed parts of diffraction grating (nm) | 20 to 300 | 20 to 300 | | | | |
| Diffractive optical element part (inorganic material) | Material name | | | Titanium oxide | Titanium oxide | Silicon nitride | Silicon carbide |
| | Film thickness (nm) | | | 300 to 500 | 300 to 500 | 300 to 500 | 300 to 500 |
| | Heating temperature in diffractive optical element part forming step (C) | | | 120 to 150 | 120 to 150 | 120 to 150 | 120 to 150 |
| | Pitch of diffraction grating (nm) | | | 150 to 500 | 150 to 500 | 150 to 500 | 150 to 500 |
| | Level difference between protruding parts and recessed parts of diffraction grating (nm) | | | 150 to 300 | 150 to 300 | 20 to 300 | 20 to 300 |
| Number of acquired light guide plates (pieces/one sheet of wafer) | | 10 | 24 | 10 | 24 | 24 | 24 |
| Size of light guide plate | | 40 mm × 50 mm × 0.3 mm | | | | | |
| | No. | 13 | 14 | 15 | 16 | 17 | 18 |
| Glass part | Material | Glass C | | | | | |
| | Diameter (mm) | 200 | 300 | 200 | 300 | 300 | 300 |
| | Area of one main surface (mm$^2$) | 31400 | 70650 | 31400 | 70650 | 70650 | 70650 |
| | Thickness (mm) | 0.3 | 0.3 | 0.3 | 0.3 | 0.3 | 0.3 |
| | BOW before formation of diffractive optical element part | 10 μm | 30 μm | 10 μm | 30 μm | 30 μm | 30 μm |
| Diffractive optical element part (organic material) | Material name | Siloxane polymer | Siloxane polymer | | | | |
| | Film thickness (nm) | 300 to 500 | 300 to 500 | | | | |
| | Heating temperature in diffractive optical element part forming step (° C.) | 125 | 125 | | | | |

TABLE 2-continued

| | | | | | | | |
|---|---|---|---|---|---|---|---|
| | Pitch of diffraction grating (nm) | 150 to 500 | 150 to 500 | | | | |
| | Level difference between protruding parts and recessed parts of diffraction grating (nm) | 20 to 300 | 20 to 300 | | | | |
| Diffractive optical element part (inorganic material) | Material name | | | Titanium oxide | Titanium oxide | Silicon nitride | Silicon carbide |
| | Film thickness (nm) | | | 300 to 500 | 300 to 500 | 300 to 500 | 300 to 500 |
| | Heating temperature in diffractive optical element part forming step (° C.) | | | 120 to 150 | 120 to 150 | 120 to 150 | 120 to 150 |
| | Pitch of diffraction grating (nm) | | | 150 to 500 | 150 to 500 | 150 to 500 | 150 to 500 |
| | Level difference between protruding parts and recessed parts of diffraction grating (nm) | | | 150 to 300 | 150 to 300 | 20 to 300 | 20 to 300 |
| Number of acquired light guide plates (pieces/one sheet of wafer) | | 10 | 24 | 10 | 24 | 24 | 24 |
| Size of light guide plate | | 40 mm × 50 mm × 0.3 mm | | | | | |

The embodiments disclosed this time should be considered to be illustrative in all respects and to be not restrictive. The scope of the present invention is indicated not by the above-described description but by the claims, and it is intended that all modifications made within the meanings and scopes equivalent to the claims are included.

For example, an optical glass according to an aspect of the present invention can be produced by adjusting the composition described in the specification with respect to the glass composition mentioned above as an example.

Furthermore, it is definitely possible to arbitrarily combine two or more of the matters described as examples or preferred embodiments in the specification.

What is claimed is:

1. A glass wafer for manufacturing a light guide plate, the glass wafer comprising:

a glass part in a thin sheet shape; and a diffractive optical element part on two main surfaces of the glass part, wherein one main surface of the glass part has an area of 1950 $mm^2$ or greater, the glass part has a thickness of 3.0 mm or less, the glass part has a Young's modulus of 100 GPa or greater, and the glass part satisfies at least one of the following conditions (i) or (ii):

(i) the glass part has a content of $La_2O_3$ of 25% to 60% by mass, and (ii) the glass part has a total content of $La_2O_3$, $Gd_2O_3$, $Y_2O_3$, and $Yb_2O_3$ [$La_2O_3$+$Gd_2O_3$+$Y_2O_3$+$Yb_2O_3$] of 25% to 68% by mass.

2. The glass wafer according to claim 1, wherein the diffractive optical element part has a periodic uneven structure, and the uneven structure has a period of 500 nm or less.

3. The glass wafer according to claim 2, wherein the difference between an effective area length c and a run length b is within ±5% of a period of the uneven structure of the diffractive optical element part, wherein the effective area length c is defined as (Φ/2)-5 mm, and is a radius of a circle A that encloses an area where the diffractive optical element is formed on the main surface of the glass part having a diameter of Φ mm, and wherein the run length b is defined as a distance from a center of the glass part to a circumference of the circle A in a state in which the glass part is viewed in a plan view from a direction of a central axis.

4. The glass wafer according to claim 1, wherein the glass part has a refractive index nd of 1.9 or greater.

5. The glass wafer according to claim 1, wherein an average linear expansion coefficient of the glass part at −30° C. to 70° C. is $80\times10^{-6}$ $K^{-1}$ or less.

6. The glass wafer according to claim 1, wherein the material of the diffractive optical element part is a transparent inorganic material.

7. The glass wafer according to claim 6, wherein the transparent inorganic material is titanium oxide, silicon nitride, or silicon carbide.

8. The glass wafer according to claim 1, wherein the material of the diffractive optical element part is a transparent organic material.

9. The glass wafer according to claim 8, wherein the transparent organic material is an ultraviolet-curable resin.

10. The glass wafer according to claim 1, wherein the glass part has a total content of $B_2O_3$ and $SiO_2$ [$B_2O_3$+$SiO_2$] of 5% to 25% by mass.

11. The glass wafer according to claim 1, wherein the glass part has a total content of $TiO_2$, $Nb_2O_5$, $Ta_2O_5$, and $WO_3$ [$TiO_2$+$Nb_2O_5$+$Ta_2O_5$+$WO_3$] of 5% to 40% by mass.

12. The glass wafer according to claim 1, wherein the glass part has a content of $B_2O_3$ of 3% to 20% by mass.

13. A light guide plate comprising:

a glass part; and a diffractive optical element part on two main surfaces of the glass part, wherein the glass part has a thickness of 3.0 mm or less, the glass part has a Young's modulus of 100 GPa or greater, and the glass part satisfies at least one of the following conditions (i) or (ii):

(i) the glass part has a content of $La_2O_3$ of 25% to 60% by mass, and (ii) the glass part has a total content of $La_2O_3$, $Gd_2O_3$, $Y_2O_3$, and $Yb_2O_3$ [$La_2O_3$+$Gd_2O_3$+$Y_2O_3$+$Yb_2O_3$] of 25% to 68% by mass.

14. The light guide plate according to claim 13, wherein the diffractive optical element part has a periodic uneven structure, and the uneven structure has a period of 500 nm or less.

15. The light guide plate according to claim 13, wherein the glass part has a refractive index nd of 1.9 or greater.

16. An image display device comprising the light guide plate according to claim 13.

17. The image display device according to claim 16, wherein the image display device is a spectacle-type device.

18. The light guide plate according to claim 13, wherein the glass part has a total content of $B_2O_3$ and $SiO_2$ [$B_2O_3$+$SiO_2$] of 5% to 25% by mass.

19. The light guide plate according to claim 13, wherein the glass part has a total content of $TiO_2$, $Nb_2O_5$, $Ta_2O_5$, and $WO_3$ [$TiO_2$+$Nb_2O_5$+$Ta_2O_5$+$WO_3$] of 5% to 40% by mass.

20. The light guide plate according to claim 13, wherein the glass part has a content of $B_2O_3$ of 3% to 20% by mass.

* * * * *